United States Patent

[11] 3,615,709

| [72] | Inventors | Andrew George Ford<br>Hitchin;<br>Ronald Augustus Hudson, Welwyn Garden City, both of England |
|---|---|---|
| [21] | Appl. No. | 749,430 |
| [22] | Filed | Aug. 1, 1968 |
| [45] | Patented | Oct. 26, 1971 |
| [73] | Assignee | Imperial Chemical Industries Limited<br>London, England |
| [32] | Priorities | Aug. 1, 1967 |
| [33] | | Great Britain |
| [31] | | 35335/67;<br>Aug. 1, 1967, Great Britain, No. 35337/67 |

[54] PLASTIC FILM PACKAGE CONTAINING CONTENTS UNDER SUPERATMOSPHERIC PRESSURE
7 Claims, 6 Drawing Figs.

[52] U.S. Cl. .................................................. 99/171 S,
99/171 B, 99/171 LP, 206/46 R, 206/46 F, 229/3.5 R
[51] Int. Cl. .................................................. B65d 45/16,
B65d 81/20

[50] Field of Search .......................................... 99/171 LP,
171 B, 171 S; 150/.5; 215/1.5; 206/46 R, 46 F;
229/3.5 R; 264/210

[56] References Cited
UNITED STATES PATENTS

| 2,686,726 | 8/1954 | Grantham | 99/171 X |
|---|---|---|---|
| 3,274,004 | 9/1966 | Curler et al. | 99/171 |
| 3,296,352 | 1/1967 | Riggs | 264/210 |
| 2,781,900 | 2/1957 | Snyder et al. | 206/46 |

FOREIGN PATENTS

| 639,812 | 4/1962 | Canada | 99/171 |
|---|---|---|---|
| 926,159 | 5/1963 | Great Britain | 99/171 |

*Primary Examiner*—Frank W. Lutter
*Assistant Examiner*—William L. Mentlik
*Attorney*—Cushman, Darby & Cushman ABSTRACT: A package comprising a container formed of oriented film of polyethylene terephthalate, containing a gas under pressure, e.g. a carbonated drink.

PATENTED OCT 26 1971 3,615,709
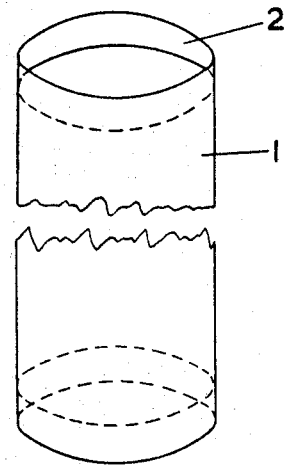
Fig. 1
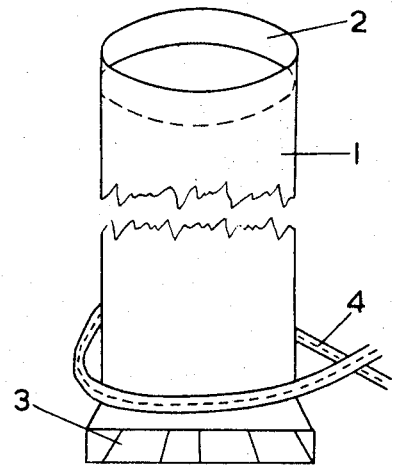
Fig. 2
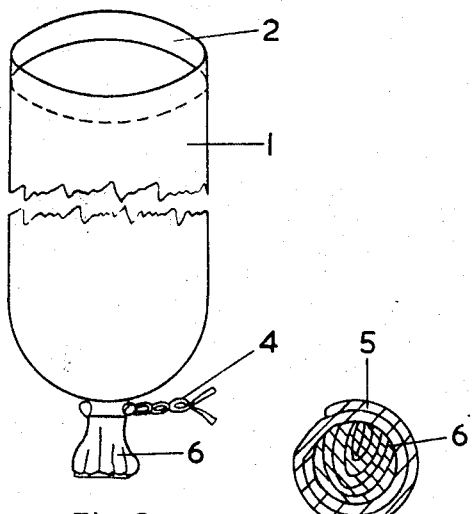
Fig. 3  Fig. 5  Fig. 4
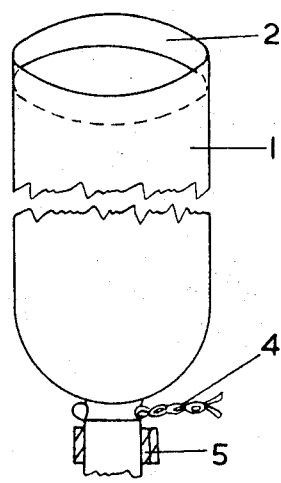
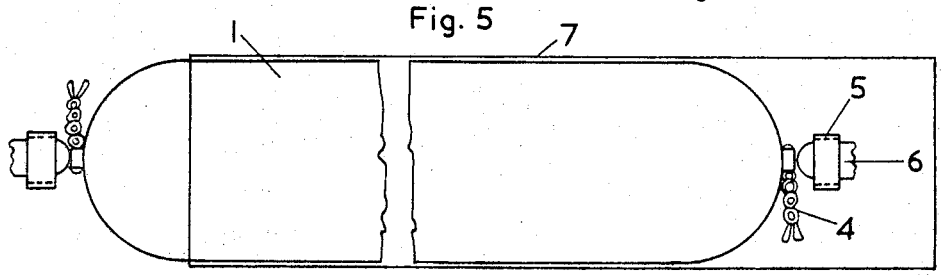
Fig. 6
INVENTORS
ANDREW GEORGE FORD
RONALD AUGUSTUS HUDSON
BY
Cushman, Darby & Cushman
ATTORNEYS

PLASTIC FILM PACKAGE CONTAINING CONTENTS UNDER SUPERATMOSPHERIC PRESSURE

This invention relates to packages comprising filled containers of plastics film with contents under superatmospheric pressure.

The invention relates particularly to plastics film containers for gas-containing liquids, particularly carbonated drinks. It may also be applied to the packaging of other liquids or of articles or solid substances in plastics film containers made rigid by enclosing therein a gas or vapor under pressure, to increase sales appeal or to protect fragile contents. It may also be used in packaging gases, alone, or low-boiling liquids that generate pressure under normal storage conditions. In the term "gas" we shall hereinafter include vapors of low-boiling liquids, e.g. aerosol propellents.

It has previously been proposed to package substances or articles in pressurized plastics film containers, for example in containers of polythene (polyethylene) film. Such packages, however, have not been capable of withstanding pressures as high as those developed within containers of carbonated drinks: that is, pressures often exceeding about 20 p.s.i. gauge.

We have now found that oriented polyethylene terephthalate film may be used to contain such pressures, and that containers so made have a number of further advantages.

In accordance with the present invention, therefore, a package comprises a container having at least a layer of its wall formed from an oriented film of polyethylene terephthalate, with contents under superatmospheric pressure.

For some applications, the container wall may consist wholly of oriented polyethylene terephthalate film. For other applications, it may need to be formed from oriented polyethylene terephthalate film coated with, or laminated to, a layer of another material, or provided with a close-fitting sleeve of another material. For example, where the gas to be contained is one to which oriented polyethylene film is too permeable for pressure to be maintained over sufficiently long periods, as is the case with carbon dioxide in the packaging of carbonated drinks, the film should be coated with, or laminated to, a layer of gas impermeable material, or provided with a close-fitting sleeve thereof, at least over a major portion of its area. A close-fitting sleeve may also be provided to increase the bursting strength of the container. This may be of a material that will provide both high strength and impermeability to gases, or it may be also formed of oriented polyethylene terephthalate film.

The container may be sealed by any method giving a seal capable of withstanding the pressure of the contents. Seals formed by heat sealing or by adhesives and without reinforcement by mechanical closures must be strongly bonded, and are preferably lap seals, which are not subjected to direct peeling forces. A preferred method of closing the containers, particularly for contents under relatively high pressures, such as 5 p.s.i. or above involves closing the container by at least one bunched neck, with a ligature or other encircling closure applied to the bunched neck below a region thereof that is of greater cross-sectional area than the region encompassed by the encircling closure, and all capillaries through the bunched neck are sealed against egress of gas from the container. The region of greater cross-sectional area may conveniently be provided by the inclusion of additional layers of material, preferably in the seal provided to seal the capillaries. For example, it may be provided by turning over and sealing down the end of the container before the neck is bunched, or by adhering a tape to the inside surface of the neck before it is closed.

The package of the present invention is particularly useful for the marketing of carbonated drinks, for which the packages may be formed from sections of seamless lay-flat tubing of oriented polyethylene terephthalate film, closed at each end by a closure as described. The pressure within such containers is generally above 5 p.s.i. gauge at a temperature of about 15° C., and can rise to as high as 60 p.s.i. with highly carbonated products under very warm conditions.

The packages preferably include a layer of material highly impermeable to water vapor, carbon dioxide and oxygen over at least the major part of their surfaces. Particularly useful materials for this purpose are vinylidene chloride polymers and copolymers, particularly copolymers of vinylidene chloride with a lesser proportion of acrylonitrile, for example copolymers containing between 80 percent and 95 percent by weight of vinylidene chloride and up to 20 percent of acrylonitrile and, if desired, small proportions of other monomers such as itaconic acid or methacrylic acid. The coating may be applied to the inner or outer surface of the film; it is usually more convenient to coat the outer surface. Such coatings have the additional advantage that they form strong heat seals.

An unexpected advantage of the package of the invention is that, even with the high internal pressure of gas, the package may be pricked with a pin without bursting and without violent escape of gas. This greatly facilitates the opening of the package, since the excess pressure may first be released by a pin-prick applied to the gas space, and the package then opened by cutting the film or by other suitable method. Tear tapes may be provided for this purpose if desired. The package may be placed in a free-standing support to be opened, or a free-standing sleeve, for example of cardboard, may be provided as a part of the package.

The packages of the invention are also unexpectedly attractive in appearance and handling, giving the impression of a clear glossy glass tube. This may be because of the high clarity and the particular mechanical and surface properties of the oriented polyethylene terephthalate film.

For tubular containers of polyethylene terephthalate film, closed by a bunched and sealed neck at each end, and without a reinforcing sleeve on the cylindrical portion thereof, it is generally preferred that the film be biaxially oriented so that, where the circumferential draw ratio is $x:1$ and the longitudinal draw ratio is $y:1$, then the product $xy$ is from 7 to 16, preferably from 12 to 15, and the ratio $x/y$ is from 1.2 to 2.5, preferably from 1.3 to 1.8. By selecting draw ratios within this range, the thickness of film required to contain a given maximum pressure within the containers may be kept to a minimum, which gives an economic advantage.

When a close-fitting sleeve is placed upon the cylindrical part of the container to provide increased bursting strength, however, it will often be preferred that the tubular container itself be formed of film that is oriented to a higher draw ratio in the longitudinal than in the circumferential direction, while still having a product of draw ratios within the range seven to 16. This will give improved bursting strength in the two ends of the container, which are not supported by the sleeve.

Our invention is illustrated but in no way limited by the following example, in which reference will be made to the accompanying drawings.

In the drawings, FIG. 1 shows tubing suitable for forming into the present containers.

FIG. 2 is shown by the tubing of FIG. 1 being flattened at one end.

FIG. 3 shows the tubing of FIG. 2 with a bunched neck and a ribbon drawn and tied around the bunched neck.

FIG. 4 shows the tubing of FIG. 3 having a metal clip tightened around the bunched neck.

FIG. 5 shows an end view of the bunched neck and metal clip of FIG. 4.

FIG. 6 shows a finished container and the container is part enclosed by a support sleeve.

EXAMPLE

A number of lengths of 80 gauge (0.0008 inch thick) polethylene terephthalate layflat tubing, 1, of 10 inches length and 2½ inch layflat width, oriented to a draw ratio of 4.5:1 circumferentially and 2.9:1 longitudinally, were formed into containers and filled in the manner shown diagrammatically in the drawings. Thus, each length of tubing was first provided at each end with a gasketing layer, 2, of double coated adhesive tape, 1 inch wide. The tape was applied all round the internal surface at each extremity of the tubing, as shown in FIG. 1. The tubing was flattened at one end (FIG. 2)(the bottom end of the container) to seal together, at 3, the opposed surfaces of the adhesive tape, and immediately above the tape the tubing was encircled by a five thirty-seconds inch wide plastic covered wire ribbon, 4. The ribbon was drawn tight and tied, and the ends were passed again around the resulting bunched neck of the tube, and twisted together (FIG. 3). The gasketing layer provided a thickened region in the neck, immediately beyond the ligature. A metal clip, 5, was then tightened around taped region, 6, of the bunched neck (FIG. 4). This clip was a U-shaped clip, made of seven thirty-seconds inch × one thirty-second inch aluminum strip, of the type applied to such a bunched closure by placing the slip around the neck and clenching it so that the free ends of the legs of the clip pass each other during the clenching operation and finally lie one above the other, as shown in section in FIG. 5. The tube thus closed at one end was opened out in a suction mould, and was filled with carbonated lemonade at 2° C. The top of the container was then closed in the manner described for the bottom, this operation being carried out rapidly, before a high pressure had been developed. The finished container (FIG. 6) was then removed from the mould and may optionally be supported by a free-standing support such as tube or sleeve 7.

When the packages had warmed to room temperature (18° C.) the pressure in the air spaces, occupying about 5 percent of the total volume of the containers, was in each case about 15 p.s.i. gauge. The resulting packages were of surprisingly attractive appearance and handle, remarkable resembling filled glass tubes.

Several of the containers were placed in cardboard tubes ending at a level just below the liquid level and were punctured by pricking them at the air space with a pin. Instead of the containers bursting, as had been expected, the result was merely that the excess gas escaped quite gently through the pinhole, and the containers could then be easily opened by cutting with scissors, and the contents emptied into glasses.

As well as its application to the packaging of carbonated drinks, the invention may be applied to the packaging of other pressure-generating liquids, for example aerosol propellents and wines. The packages may also be adapted for use as aerosol containers or for the packaging of liquids under pressure to give substantially rigid packages. Products that may be packed in such manner include: household products, such as liquid detergents, liquid bleach, fabric softeners, starch solutions, drycleaning fluid, liquid waxes and polishes, window cleaners, disinfectants, paints, varnishes, linseed oil; adhesives; inks, and other artists' materials; medical and pharmaceutical liquids such as blood, sterile water, medicines and alcohol; motor car products such as lubricating oil, thin oil, battery liquid, polishes and shampoos; fire extinguishing liquids; potable liquids such as milk and milk products, natural or synthetic cream and cream products, fruit squash, fruit juices, spirits; garden products such as insecticides, fungicides, herbicides, fertilizers; toilet and cosmetic products such as nail varnish, liquid shampoo, toilet water, hair-setting lotion, hand creams; and food products such as canned fruit and vegetables, soups, ketchups, salad dressings, edible oils, salad oils, vinegar, syrup, coffee essences, flavorings.

We claim:

1. A package comprising a filled container formed from a length of biaxially oriented tubular film of polethylene terephthalate having on at least one of its surfaces a layer of a vinylidene chloride copolymer, the contents of said container being under superatmospheric pressure, the container being cylindrical intermediate its ends, having a seal at each end and a close-fitting sleeve around the cylindrical part of said container to reinforce the same against bursting.

2. A package as claimed in claim 1 in which the sleeve provides a free-standing support for the package.

3. A package according to claim 1 wherein the container comprises film that is oriented to a higher draw ratio in the longitudinal than in the circumferential direction, while having a product of draw ratios within the range 7 to 16.

4. A package as claimed in claim 1 in which the contents are beer or another carbonated drink.

5. A package as claimed in claim 1 in which the contents are an article or articles, or a solid substance, and a gas under superatmospheric pressure.

6. A package as claimed in claim 1 in which the container has a bunched neck at each end thereof, said bunched neck having a mechanical closure thereabout.

7. A package comprising a container formed from tubular biaxially oriented film of polyethylene terephthalate and filled with material under superatmospheric pressure, said container having a cylindrical portion intermediate the ends and being sealed at each end and having a bunched neck and a ligature surrounding said bunched neck.

* * * * *